United States Patent [19]

Tersteegen

[11] 4,343,331

[45] Aug. 10, 1982

[54] ELECTRO-HYDRAULIC ACTUATING DEVICE AND A FAST-SWITCHING MAGNETIC VALVE FOR USE THEREIN

[75] Inventor: Johannes Tersteegen, Brunswick, Fed. Rep. of Germany

[73] Assignee: Deutsche Forschungs- und Versuchsanstalt fur Luft- u. Raumfahrt, Cologne, Fed. Rep. of Germany

[21] Appl. No.: 265,414

[22] Filed: May 19, 1981

Related U.S. Application Data

[62] Division of Ser. No. 43,782, May 30, 1979, Pat. No. 4,281,584.

[30] Foreign Application Priority Data

Jan. 8, 1979 [DE] Fed. Rep. of Germany ....... 2900473

[51] Int. Cl.³ .......................................... F16K 11/02
[52] U.S. Cl. .......................... 137/625.65; 137/596.16; 137/596.17; 137/DIG. 2
[58] Field of Search .................. 137/596.16, 596.17, 137/625.65, 864, 870, DIG. 2

[56] References Cited

U.S. PATENT DOCUMENTS

| | | | |
|---|---|---|---|
| 2,861,550 | 11/1958 | Hanna et al. | 137/596.16 X |
| 3,643,699 | 2/1972 | Mason | 137/625.65 X |
| 3,828,818 | 8/1974 | Hunt | 137/625.65 |

*Primary Examiner*—Gerald A. Michalsky
*Attorney, Agent, or Firm*—Salter & Michaelson

[57] ABSTRACT

An electro-hydraulic actuator is disclosed, particularly for use with control surfaces in aircraft. The actuator includes a regulating piston and cylinders and rapidly-operable switching valves for the positioning of the piston in the cylinder that are operated by the supplying of discrete volumes of operating fluid thereto. Switching pulses are applied to the valves by a computer, and a sensor that is responsive to each activation of the switching valves applies an answering pulse to the computer wherein a valve breakdown can immediately be recognized. The sensor may be responsive to changes in pressure and/or flow between the valves and the cylinder located at the valve body.

3 Claims, 6 Drawing Figures

- field current
- armature stroke
- pressure $P_A$ (dead volume 0,24 cm³)

pressure of the system $P_S$ = 200 ± 1bar pressure in the return pipe $P_R$ = 0 bar $T_{oil}$ = 27 ± 1 °C

ELECTRO-HYDRAULIC ACTUATING DEVICE AND A FAST-SWITCHING MAGNETIC VALVE FOR USE THEREIN

This is a division of application Ser. No. 43,782 filed May 30, 1979, now U.S. Pat. No. 4,218,584.

BACKGROUND OF THE INVENTION

The invention relates to an electro-hydraulic actuator and to a fast-switching magnetic valve for use therein, and has use particularly with control surfaces in aircraft.

By means of an electro-hydraulic actuator, it is possible to control movable surfaces of relatively high power level in aircraft, for example aircraft rudders, by electrical signals. In order to achieve the degree of safety necessary in aircraft, high demands are made for reliability in the actuator, in particular for the reliable recognition of breakdowns.

In the prior known actuators in aircraft, designed as servo circuits, the electrical elements in relation to the reliability are the means for the provision of feed back and the servo valve. Owing to the analogue processing of signals, the recognition of breakdown presents difficulties. Also, with known actuators which operate with pilot valves in place of servo valves, the provision of feed back has been retained in such devices proposed up to the present time.

A basic object of the invention is to devise an actuator which is very simple in its construction and in its function and by means of which it is possible to recognize breakdowns with certainty without additional systems being necessary for this purpose.

A further object is to device a magnetic valve which can be used particularly advantageously in the construction of the actuator as embodied in the present invention.

SUMMARY OF THE INVENTION

The objects as set forth hereinabove are solved according to the invention by providing a regulating drive that includes a regulating cylinder having a piston located therein. Rapidly-operable switching valves are also provided for the positioning of said piston in said cylinder by supplying discrete volumes of operating fluid thereto. A computer of conventional design controls the application of switch pulses to said valves, and a sensor that is responsive to each activation of said switching valves applies an answering pulse to said computer. The sensor is responsive to changes in pressure and/or flow and/or sound conducted by solid materials, which occur between the switching valves and the cylinder respectively at the switching valve body and defines the means for the recognition of breakdowns.

By means of a rapid-acting magnetic valve it is possible to measure the flow of oil exactly, even in very small amounts. For example, with a maximum volume flow of 1.5 l/m, the smallest amount which can be controlled is 0.003 cm$^3$. The recognition of breakdown takes place by monitoring the pressure or the flow of hydraulic fluid in the conduits leading to the regulating cylinder by means of sensors provided in accordance with the invention. The sensor signals are compared with the control signals and are analyzed for the recognition of breakdown. An analog feed back of the regulating distance is no longer necessary. By the use of a pulsed control signal with very high cycle frequencies it may be determined that the time interval between tests is very small for both switching states of the valve. Thus the probability of a concealed error can be reduced to a minimal value. The rapid-acting switching valve provided in accordance with the invention is a magnetically operated bistable, 3/2-way, valve with a spherical valve closure member, which is lifted from a valve seat and coordinated with the return flow by means of a plunger movable in the axial direction by the magnetic drive and which is urged into firm engagement against an oppositely situated valve seat coordinated with the inward flow. Extremely small switching times, which may, for example, be less than 1 millisecond, can be achieved with directional valves of this type.

With orifices of diameters in the range between 0.8 mm and 2.5 mm, directional valves of this type may be used to measure the smallest possible volumes and to supply them to the load, in this case the cylinder, which will then be moved into the positions as predetermined at any given time. The minimum duration of opening of the valve is in the case of the magnitude of miliseconds. For a valve with an orifice of 0.8 mm diameter, balls of diameter 1.2 mm are used as valve closure members, while with orifices of 2.5 mm diameter, balls of diameter of 4 mm are used. For reliable operation of the valve it is a necessary condition that the ball acting as the valve closure member should seal off the flow without leakage when in its closure position. For valves of this type the necessary lifetime is about $5 \times 10^8$ switching cycles.

It is necessary to manufacture the housing of the directional valve in two parts, each providing a valve seat between which a ball valve member moves to-and-fro. With dimensions as stated above, deviations between the axes of the oppositely situated valve seats, due to manufacture, cannot be avoided. In this case the deviations may be large in relation to the dimensions of the ball. Thus a danger arises that under the force of the plunger on the ball, the ball may be pressed to one side against the valve seat and thus will not achieve the definitive closure position, with the result that a leakage flow of oil or other hydraulic fluid will escape.

In order to achieve the result that, with a simple process of manufacture, it is possible to produce a reliable seal by means of the plunger-actuated spherical valve member and, in addition, that the least possible volume allowed to pass the valve as a function of time may be improved, it is proposed, in accordance with this invention, that there should be provided a lateral guide fixed within the valve housing for the spherical valve member in the region of the valve seat which is associated with the pressure inlet, said guide being concentric with the valve seat with small clearance and extending away from the valve seat to beyond the largest diameter of the valve member when in the closure position, and that in the region of the valve seat associated with the return flow, the valve member is guided laterally with clearance which is greater than the maximum positional error due to manufacture. As will be described, the guide may be formed by at least three guide ribs.

In addition, the plungers for operating the valve members may be arranged to be actuated by a bistable polarized rotary magnet system, including an armature having limbs which are movable substantially in the axial direction of the plungers, and the limbs being movable through air gaps which can be adjusted independently of each other by means of adjustable stops on the armature limbs and/or the plungers.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a diagrammatic illustration of an airplane steering and control system embodied in the present invention in which an electro-hydraulic actuator device is employed, having a servo unit for use with a rudder setting device, and being free from feed back;

FIG. 2 is a diagrammatic illustration of a first embodiment of the actuator device embodied herein that is free from feed back;

FIG. 3 illustrtes another embodiment of the actuator device, free from feed back;

DESCRIPTION OF THE VARIOUS EMBODIMENTS

Figures 1, 2, 3:
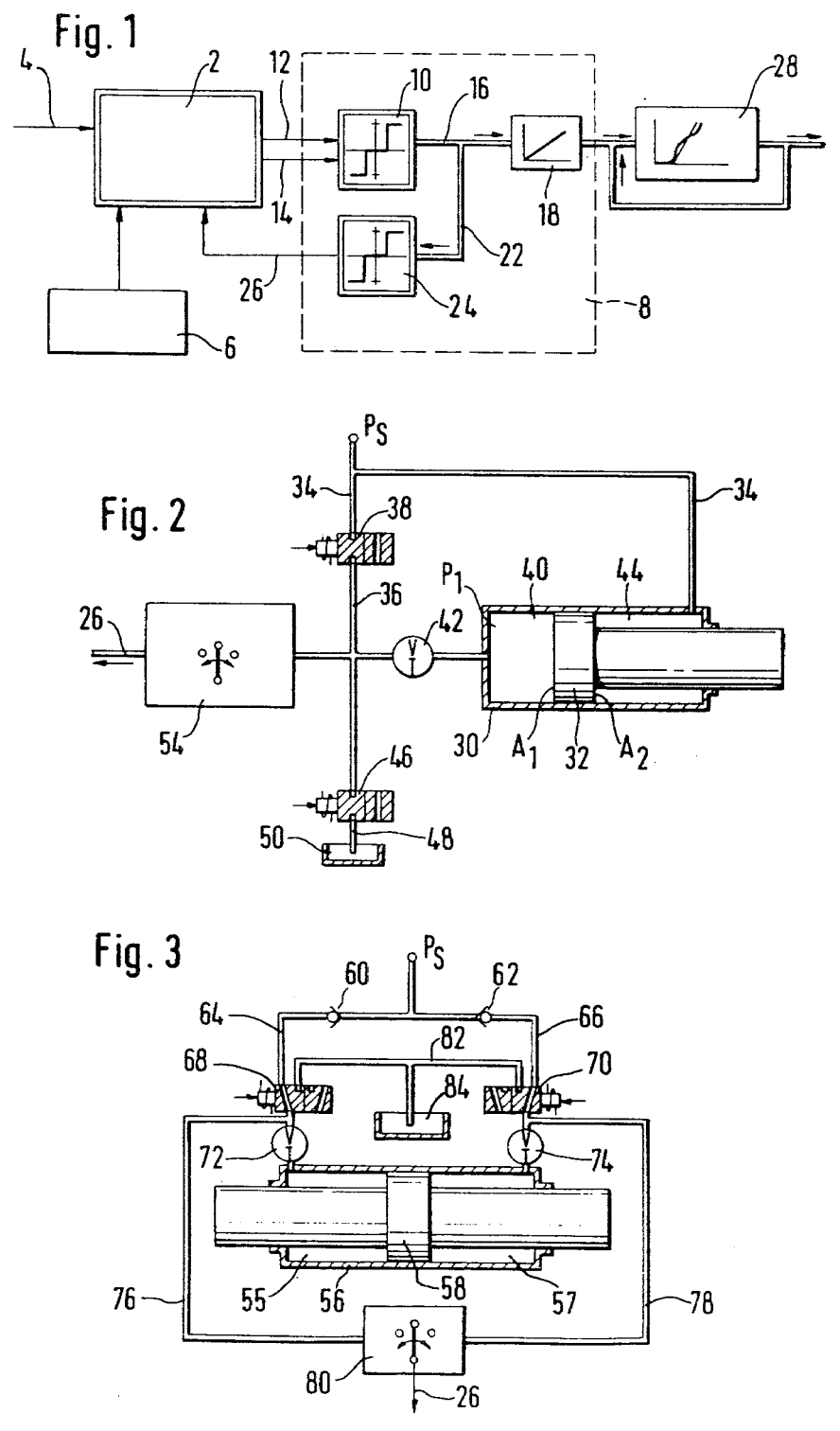
Figure 4:
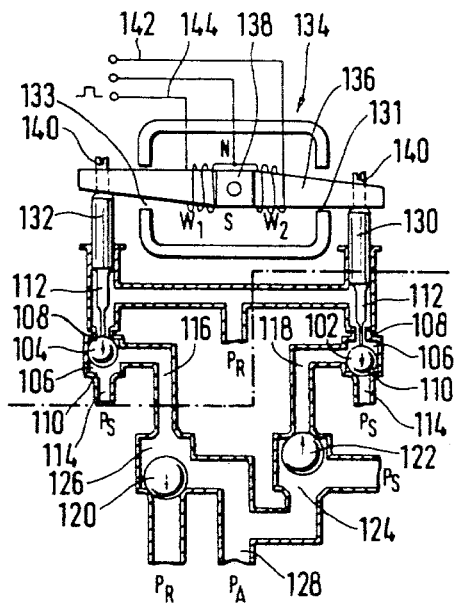
FIG. 4 schematically illustrates a two-stage, 3/2-way, valve which may be used in the actuator device.

The control system as shown in FIG. 1 includes a process computer of conventional design acting as automatic pilot to which the pilot command 4 is introduced as the required value. In addition, the flight position quantities 6, determined in the usual way, are transmitted to the process computer 2.

The actuating device, with recognition of breakdown, designed according to the invention is included in the block illustrated in phantom and indicated at 8. The actuating device 8 includes electro-hydraulic switch valves 10 which are activated by the process computer 2 through electrical leads 12, 14. The switch valves 10 are connected to a suitable hydraulic system, not illustrated in FIG. 1.

The volume of oil measured by the valves 10 is fed through a conduit 16 to a regulating cylinder 18. A sensor 24, dependent on pressure and/or flow, is connected to the conduit 16 by a conduit 22, where, at each activation, the sensor 24 emits an electrical signal which is fed back to the process computer 2 through a signal connection 26. In the process computer 2 the signals emitted by the sensor 24 are compared with the electrical switch pulses of the switch valves 10, in such a way that breakdowns, for example, failure of a switch valve to switch over, are immediately recognizable. A rudder setter 28 is controlled by the proportionally operating actuating device, and for its part, activates the rudder not illustrated in FIG. 1.

The electro-hydraulic switch valves 10 are preferably magnetically-controlled ball valves and are, in particular, bistable-controlled ball valves. Switching times of the order of magnitude of 1 ms. are possible with magnetically-controlled ball valves. The switching time of the valves should be as short as possible since the resolving power depends directly on rapid operation. The throughput quantity of the valve can be adapted to the requirements at any particular time by pulse modulation.

Control by the method of differential modulation of pulse duration has been shown to be particularly convenient. This method operates with a constant cycle time. Here the time of opening, or the length of the switch pulse, is varied within individual cycles in such a way that the computer 2 first produces long pulses succeeded by pulses of decreasing length until the required throughput quantity has been achieved. In extreme cases, the required throughput quantity may be allowed through within one cycle. When the required throughput quantity and thus the required setting have been achieved, both valves are at rest.

In the embodiment of the regulating drive illustrated in FIG. 2, a regulating cylinder 30 includes a differential piston 32 as the regulating piston. The piston has a face $A_1$ at the front end of the larger diameter and a face $A_2$ at the end of the smaller diameter. The cylinder chamber 44 containing the piston end of smaller diameter is permanently connected by means of a conduit 34 to a hydraulic system, having a system pressure $P_s$.

The cylinder chamber 40 containing the end of the piston of larger diameter is connected to the hydraulic system through a supply valve 38, which is designed as a magnetically-operated 2/2-way valve, and preferably is a magnetically-operated ball valve. A conduit 36 is provided as the connection from the chamber 40 to the valve 38, a throttle or diaphragm 42 being arranged in said conduit upstream of the cylinder chamber 40. In addition, another magnetic valve 46 similar to the valve 38 is connected to the conduit 36. The outlet of the valve 46 is connected by means of a return conduit 48 to a tank 50 of the hydraulic system. Also connected to conduit 36 as a sensor is a pressure switch 54. In normal operation, the cylinder chamber 44 is maintained permanently at the pressure of the system pressure $P_s$. The other cylinder chamber 40 may either be loaded with the system pressure through the supply valve 38 or be connected through the return flow valve 46 to the return conduit 48. The ratio of surface area $A_1/A_2$ of the piston 32 may, for example, be 2:1. The mode of operation of the regulating drive can be described in terms of its three operating states.

STATE #1

When both switch valves 38 and 46 are closed, the oil volume is enclosed within the cylinder chamber 40 and pressure equilibrium is attained in the two chambers depending on the ratio of surface areas $A_1/A_2$.

STATE #2

When, starting from State 1, the supply valve 38 is opened, the pressure $P_1$ in the cylinder chamber 40 rises and moves the piston 32 towards the right. When the supply valve 38 is closed, State 1 is re-established.

STATE #3

If the return flow valve 46 is opened, the pressure $P_1$ in the cylinder chamber 40 falls and the piston 32 moves towards the left. When the valve 46 is closed, State 1, in which pressure equilibrium prevails, is again established.

In states 2 and 3 the throughflow is determined by the throttle 42. When the supply valve 38 is activated, a pressure builds up in the conduit 36 between this valve, and the throttle 42 and this pressure activates the pressure switch 54. Thus, an answering pulse to the switching pulse for the supply valve 38 emitted by the computer 2 is produced. The answering pulse is fed to the computer 2 from the pressure switch 54 and indicates a pressure rise in the conduit 36. This answering pulse indicates that the valve has responded. Acknowledgement of the operation of the return flow valve 46 is produced in a similar manner. When the valve is activated, a marked drop in pressure occurs in the conduit 36 to which the pressure switch again responds.

Movement into predetermined positions is achieved with the drive according to FIG. 2 in the following way. With supply valve 38 or return valve 46 open, a volume of oil defined by the system pressure $P_s$ and the cross-section of the throttle 42 flows into or out of the regulating cylinder 30 during the opening time which is established by the computer 2. The time of opening necessary to produce a predetermined regulation path can be calculated exactly from the oil volume and the surface area of the piston.

With a cylinder chamber 40 of the volume of the order of magnitude of 7 cm$^3$ it is possible with a piston velocity of 70 mm/sec, when using magnetically-operated ball valves with switching times of 1 ms, to control approximately 600 discrete positions of the piston.

In the second embodiment of a regulating drive with recognition of breakdown according to FIG. 3, a regulating drive cylinder 56 is provided with a compensated piston 58 of which the piston surfaces on which the pressure acts are equal in size. As before, a hydraulic system with system pressure $P_s$ is provided. Connection of the regulating cylinder 56 takes place, respectively, through return flow valves 60,62, conduits 64,66 and switch valves 68,70, designed as 3/2-way valves, which are, as before, operated magnetically. Throttles or diaphragm controls 72,74 are also connected between the valves 68 and 70 and the cylinder chambers 55 and 57. Connecting conduits 76,78 which lead to a differential pressure switch 80, are connected between the valves 68 and 70 and the throttles 72,74. The return flow connections of the valves 68 and 70 are, in each case, connected to the tank 84 of the hydraulic system through an oil return flow conduit 82.

In the embodiment according to FIG. 3, three operating states again occur.

STATE #1

The valves 68 and 70 are in the switch positions as illustrated. Both the cylinder chambers 55 and 57 are subjected to the system pressure $P_s$. Equal pressures also act on both connections of the pressure switch 80. The piston 50 is locked in its position and the pressure switch 80 is in a central position.

STATE #2

The valve 68 is switched and the cylinder chamber 55 is thus connected to the return flow conduit. Oil flows out of the cylinder chamber 55 with a velocity determined by the cross-section of the throttle or diaphragm 72. Oil is fed into the right-hand chamber 57 of the cylinder. Behind the throttle or diaphragm 72 in the direction of flow, a fall of pressure is produced which becomes effective in the conduit 76. The pressure switch 80 is activated by the pressure difference and supplies an answering pulse, confirming the response of the valve 68 to the computer 2.

After the valve 68 has been switched over, State 1 is re-established and the pressure switch returns to its central position.

STATE #3

When the valve 70 is activated, the valve chamber 57 is connected to the return flow conduit 82. In a manner analogous to that described for State 2, the piston 58 is moved towards the right. A fall in pressure is produced in the connecting conduit 78 of the pressure switch 80, the pressure switch is activated and supplies to the computer 2 an answering pulse which confirms the response of the valve 70.

Valve behavior in the form of drift, due for example to changes in the throughflow caused by temperature or pressure changes in the system, are determined by the computer 2 and are compensated for by means of mathematical functions. If a complete mathematical determination is not possible, the determination and elimination of the residual error, or alternatively the maintenance of the accuracy of positioning, may take place by measurement of an output signal dependent on position. This signal may be tapped from the rudder setting device or derived from the dynamic behavior of the aircraft. This feed back signal should serve only to compensate for errors in setting which have accumulated during a predefined interval of time during which the valves have been activated.

In contrast to conventional servo regulating drives, the system according to the invention is still capable of functioning even after failure of the feed back.

In both the embodiments described hereinbefore by way of example, pressure switches are used to produce an answering pulse to the responsive of the valves. In an analagous manner, the answering pulses could also be produced with the aid of volume flow sensors. It would also be possible to use sensors acting in dependence on sound conducted through solids on the switch valve, alone or in combination with pressure and/or flow-dependent sensors. The sensors of sound conducted through solids operate in the manner of acceleration pick-ups.

The two stage 3/2-way valve (i.e. a valve having three connections and two switch positions) is illustrated schematically in FIG. 4. A one-stage 3/2-way valve will correspond to that part above the dash-dot line of intersection. The two-stage 3/2-way valve illustrated includes in its first stage, two valve closure members 102,104 designed as balls. The balls are, in each case, located in chambers 106, which included valve seats 108 and 110, respectively, in the upper and lower ends as viewed in FIG. 4, between which the ball is switched. The valve seat 108 abuts against the connection to the return conduit 112, while the valve seat 110 abuts against the connection to the pressure conduit 114. The valve chamber 106 is, in addition, connected laterally with conduits 116,118, which lead to the valve closure members 120,122, also designed as balls, which are also arranged in chambers 124,126, in which they are movable to-and-fro between two valve seats. The chamber 126 is connected through a lateral connection to the working conduit 128 to which the valve chamber 124 is connected through a conduit which opens in the lower valve seat for the ball 122. The valve chamber 124 is also provided with a lateral pressure connection. The spherical valve closure members 120,122 are moved to-and-fro between their valve seats by the flow of liquid. The valve closure members 102,104, designed as balls, are, on the other hand, operated mechanically by plungers 130,132. These plungers are substantially coaxial with the valve seats in the valve chambers 106 and pass outward from their respective housings to the exterior through a seal. A bistable, polarized rotary magnet system 134 having a rotary magnet armature 136 which can be pivoted about the rotary axis 138 is provided as the drive. The ends of the limb of the rotary armature 136 act in conjunction with the externally situated ends of the plungers 130,132 and can be arrested in various ways, in particular, through adjustable stops which are shown here as regulating screws 140. Coils $W_1$ and $W_2$ are situated on the rotary armature 136 and are alternately acted on by current in the form of pulses through the connecting leads 142,144. Air gaps 131 and 133 are situated between the limbs of the lower yoke of the magnet and the limbs of the rotary armature.

When the valves are switched out of the operating position, as shown in FIG. 4, the left arm of the magnetic armature 136 presses the plunger 132 downwards and thus moves the ball 104 out of the position in which it cuts off the return flow and into the position in which it cuts off the feed. At the same time the ball 102 is lifted off its valve seat 110 by the system pressure and is moved upwards, together with the plunger, until it comes into sealing engagement with the valve seat 108. The conduit 116 thus becomes free from pressure and the conduit 118 is subjected to the system pressure. The two balls 120 and 122 are thus switched over so that the working connection 128 is then connected to the return flow. After switching over, the valve operates in a corresponding manner.

A one-state 3/2-way valve consists substantially of the constructional elements above the dash-dot line in FIG. 4. It operates with a single valve closure member in the form of a ball, in this case with the ball 104. In this embodiment, it is possible to regard the upper section of the plunger 130 as a fixed stop which acts in conjunction with that limb of the rotary armature which is situated above it. It is possible to provide an adjustable stop screw 140 by means of which the end position of the rotary armature can be varied.

An example of a one-stage 3/2-way valve of the type described has the following data:

| | |
|---|---|
| Ball diameter | 1.2 mm |
| Ball stroke | 0.29 mm |
| Diameter of the conduit in the region of the first stage | 0.8 mm |
| Throughflow Q at $\Delta p$ = 200 bar | 45 cm³/s |
| Total switching time $T_s$ | 1 ms |

An example of a two-stage 3/2-way valve has a first stage with the data as given above and a second stage having the following data:

| | |
|---|---|
| Ball diameter | 4 mm |
| Ball stroke | 0.55 mm |
| Diameter of conduit 2nd stage | 2.5 mm |
| System pressure | 200 bar |
| Throughflow Q with $\Delta p$ = 200 bar | 470 cm³/s |
| Total switching time $T_s$ | 1.6 ms |

Figure 6:
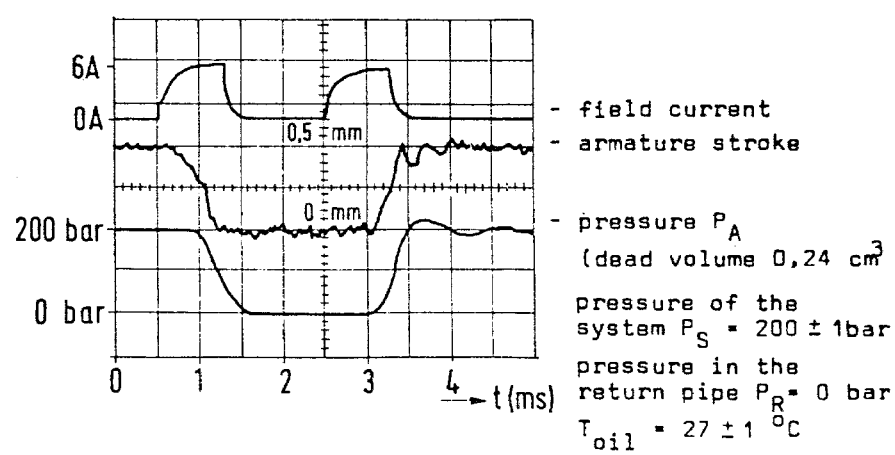
FIG. 6 is a working diagram of a one-stage, 3/2-way, valve showing the relationship between exciting current, the armature stroke and the pressure plotted against time.

As is illustrated in the working diagram (FIG. 6) of the one-stage valve, the armature immediately follows the rise in exciting current. The decrease in pressure from the system pressure $P_s = \pm 1$ bar to the return flow pressure of 0 bar is complete within 0.5 ms. The build-up of pressure takes place in approximately the same time according to the measurements illustrated. The total flowthrough during the opening stroke, as illustrated, is ~0.1 cm³. By means of the adjustable stops 140 on the limbs of the rotary armature 136 it is possible, on the one hand, to adjust the limbs of the armature relative to the plungers and, on the other hand, to vary the magnetic activating force which is determined by the air gaps 131 and 133. It is thereby possible to vary the dead time (i.e. the time from the beginning of the rise in exciting current to the beginning of movement of the armature or of the build-up of pressure) and the time occupied by pressure fall or build-up within certain limits. It is possible in this way to adjust the valves to a predetermined pressure fall or build-up curve. Optimisation of the switching time of the two-stage valve requires a phase-shifted switching of the pilot balls 102,104. This phase shift can also be achieved by adjusting the air gaps 131, 133 of the armature or the idle stroke of the plungers 130, 132.

Magnetic valves of the type described operate with opening and closing times in order of milliseconds and by repeated opening and closing, where necessary, in conjunction with changes in the length of the opening time, they deliver the total volume required for a predetermined movement stroke of a piston into a cylinder in individual volumes. This mode of operation leads to the requirement that valves of this type must be designed for an unusually high number of working cycles. A lifetime of at least $5 \times 10^8$ working cycles without the onset of leakage is desired.

For reasons of functional efficiency it is necessary to provide each valve chamber 106 with a separating plane. With the dimensions as given hereinbefore, it is impossible to avoid deviations of position between the axes of the two opposite valve seats 108 and 110. The valve plunger can be guided with high accuracy centrally to the valve seat 108 by finishing techniques.

This leads to a central application of the piston against the ball 104 which is therefore guided in balance on the front face of the plunger. If the axis of the valve seat 110 is displaced relative to the axis of the plunger and thus to the axis of the valve seat 108, then the ball strikes its seat with a corresponding lateral displacement, so that pinching of the ball between the plunger and the corresponding region of the valve seat 110 may easily occur. The valve then leaks.

Figure 5:
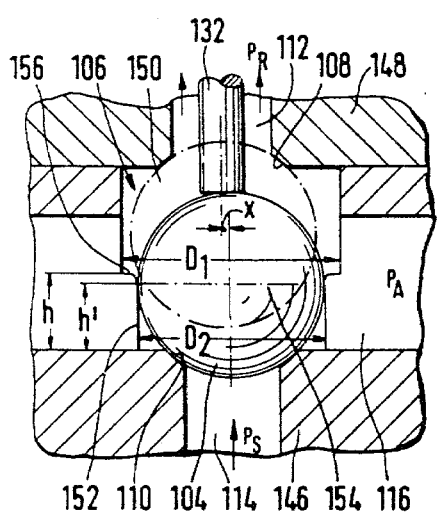
FIG. 5 is an enlarged sectional view of a spherical valve closure member and guidance therefor, the valve closure being activated by a plunger which is illustrated in FIG. 4.

The solution, according to the invention, of this problem is illustrated in FIG. 5. The valve housing here consists of two housing sections 146 and 148 joined with a tight seal. In the housing section 148, the conduit 112 which leads to the return flow is designed as a bore, at the end of which the valve seat 108 is formed. The seat 108 may easily be made concentric with the conduit 112. The plunger 132 is guided axially in the conduit 112. In the lower section 146 of the housing, the pressure conduit 114 is designed as a bore concentric with the corresponding valve seat 110. The two conduits 112 and 114, and thus the valve seats 108 and 110, have a positional error x, due to fabrication, relative to each other.

In the housing section 146 the valve chamber 106 is formed in the region of the lateral connecting bore 116. This chamber consists of an upper section 150 with diameter $D_1$ which is larger than the diameter of the ball 104 by at least the maximum positional error 2x, and is preferably large enough to ensure that the ball is movable within it without lateral guidance. In the section 152, bordering on the valve seat 110, the valve chamber 106 has a diameter $D_2$ which is so chosen that the ball is laterally guided within it with a low tolerance. The height (h) is so chosen that the largest diameter of the ball 104, at the height (h'), is situated with certainty within the guide when the ball is seated on the valve seat 110. Within the section 152, guideance may be produced by means of guide ribs of which, for example, four are provided. The entrance into the section 156 above (h') may be frustoconical or rounded.

If, in the embodiment illustrated, the ball 104 situated in the position shown in dash-dot lines is moved downwards in a straight line by the plunger 132 with the positional error x, it will strike the entry edge 156 of the section 152 of the valve chamber 106 with its circumference and will thus be mechanically forced sideways into alignment with the axis of the bore 114 and thus with the valve seat 110. The ball is thus moved or tilted sideways relative to the front face of the plunger 132 before it becomes seated on the corresponding valve seat. It is thereby ensured that the ball is seated with a tight seal around the whole circumference of the seal, even when the positional error x is relatively large. In the reverse direction of switching, the ball 104 is forced upwards by the pressure $P_s$ in the conduit 114 when the plunger 132 is freed from load. The compensation between the plunger and the ball tends towards zero at the end of the movement of the ball so that the ball is able to center itself freely on the valve seat 108.

The embodiment of the valve chamber described with reference to FIG. 5 has the advantage that it is produced without auxiliary devices and the internal diameter of the section 152, with the valve seat 110, can be worked and finished in a clamping device.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What I claim as my invention and desire to secure by Letters Patent of the United States is:

1. A switching valve designed as a magnetically-coupled bistable, 3/2-way valve, a spherical valve closure member, through which fluid from a source of supply is controllably directed and through which a return flow of said fluid is controllably directed, a plunger movable in the axial direction by means of a magnetic drive to move said valve closure member into alternative engagement with a first valve seat coordinated with the return flow and an opposite second valve seat coordinated with the supply, said valve having in the region of the valve seat coordinated with the supply a first fixed lateral guidance means for the valve member extending from the valve seat to beyond the largest diameter of the valve member when in the closure position and in the region of the valve seat coordinated with the return flow, a second fixed lateral guidance means for guiding the valve member laterally with a clearance which is greater than a maximum positional error due to maintenance of said valve seats.

2. A magnetic valve according to claim 1, in which said first guide means comprises at least three guide ribs.

3. A magnetic valve according to claim 1, said plunger for operating said valve member being actuated by a bistable polarized rotary magnet driving system including a rotary armature having limbs movable in the axial direction of the valve plunger, and adjustable stops acting between the limbs of the armature and the plunger to vary the extent of movement of said plunger.

* * * * *